United States Patent [19]
Aronson

[11] 3,906,939
[45] Sept. 23, 1975

[54] BLOOD PRESSURE MEASURING MEANS
[75] Inventor: Theodore Aronson, Fort Lauderdale, Fla.
[73] Assignee: Para-Medical Instrument Corporation, Fort Lauderdale, Fla.
[22] Filed: Jan. 10, 1974
[21] Appl. No.: 432,191

Related U.S. Application Data
[63] Continuation-in-part of Ser. No. 305,512, Nov. 10, 1972, abandoned.

[30] Foreign Application Priority Data
Aug. 23, 1973 United Kingdom............... 40076/73

[52] U.S. Cl. ........................................ 128/2.05 G
[51] Int. Cl.² ............................................ A61B 5/02
[58] Field of Search.... 128/2.05 A, 2.05 G, 2.05 M, 128/2.05 Q, 2.05 R, 2.05 S; 73/402

[56] References Cited
UNITED STATES PATENTS

| | | | |
|---|---|---|---|
| 2,020,469 | 11/1935 | Laufman et al................. | 128/2.05 G |
| 2,630,796 | 3/1953 | Eksten, Jr...................... | 128/2.05 G |
| 2,753,863 | 7/1956 | Bailey ........................... | 128/2.05 G |
| 3,254,671 | 6/1966 | Berliner........................ | 128/2.05 G |
| 3,542,011 | 11/1970 | Langenbeck................... | 128/2.05 G |
| 3,613,668 | 10/1971 | Beck et al...................... | 128/2.05 G |
| 3,623,478 | 11/1971 | Saba.............................. | 128/2.05 M |

FOREIGN PATENTS OR APPLICATIONS
696,593 10/1930 France........................... 128/2.05 G

*Primary Examiner*—William E. Kamm

[57] ABSTRACT

Blood pressure measuring apparatus utilizes a cuff containing an inflatable bladder which is inflated by pump means through the intermediary of a connecting means which also interconnects a pressure gauge with the bladder the apparatus being formed to enable interconnection of the bladder the pump means and the pressure gauge by an integral connecting means in the form of a unitary elongated flexible tube.

10 Claims, 7 Drawing Figures

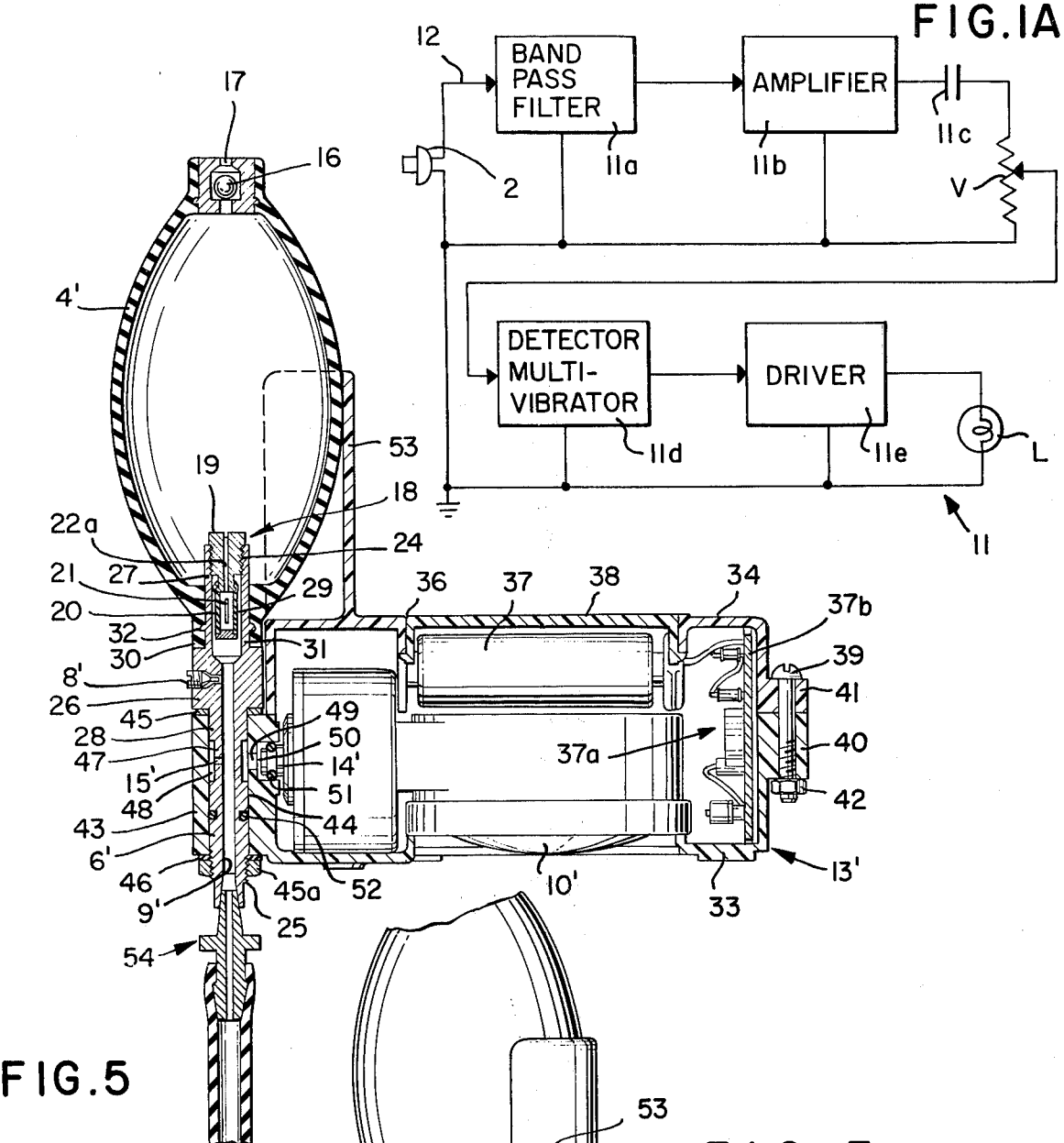

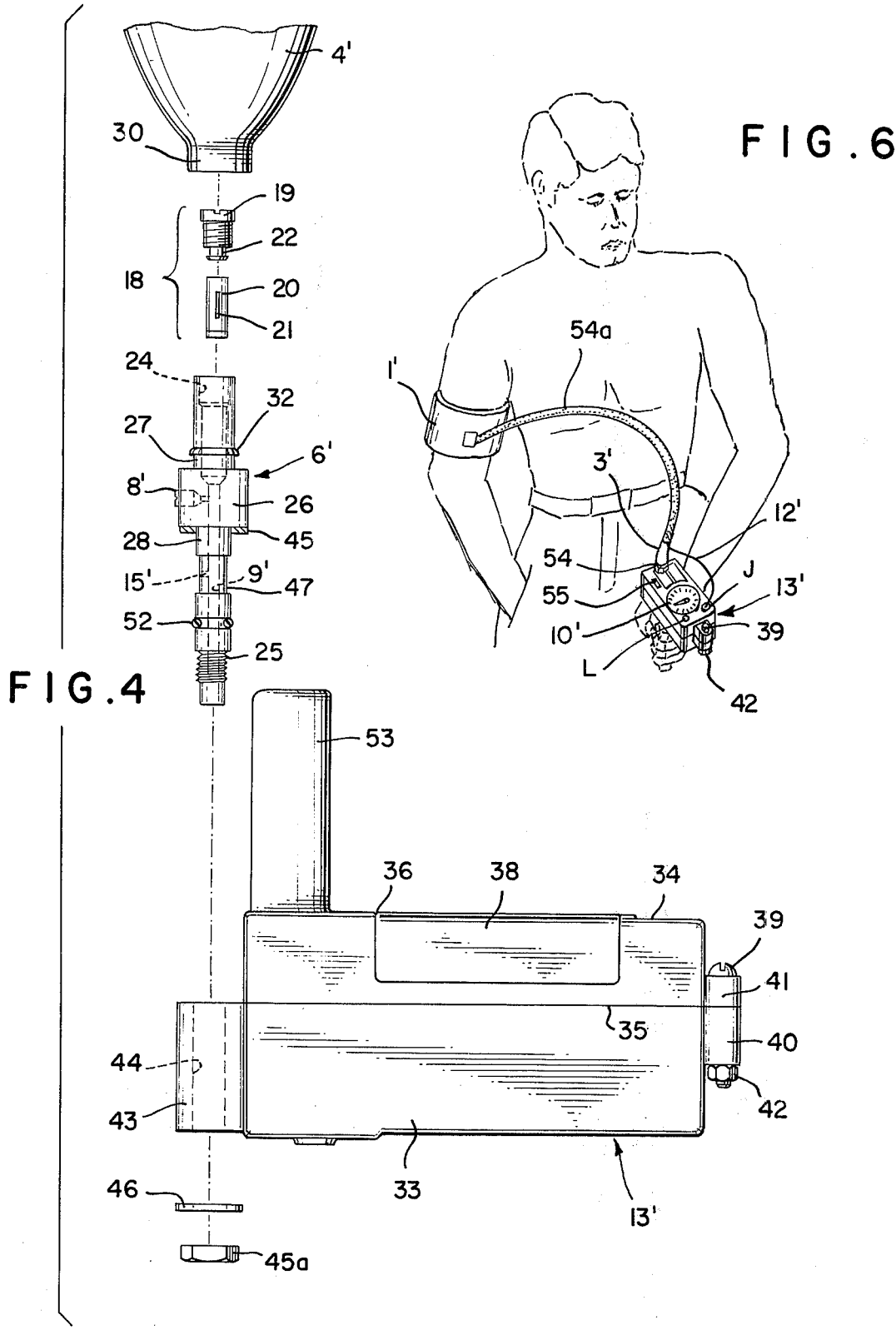

BLOOD PRESSURE MEASURING MEANS

CROSS-REFERENCE TO PRIOR APPLICATION

The present application is a continuation-in-part of my U.S. application Ser. No. 305,512, filed on Nov. 10, 1972 and now abandoned.

BACKGROUND OF THE INVENTION

This invention generally relates to blood pressure measuring apparatus. It relates more specifically to an apparatus which is electrically and mechanically adapted to permit measurement by an individual of his own blood pressure.

For ascertaining the blood pressure of an individual, it is the customary practice to mount an air inflatable cuff in a region of arterial blood flow. For example, the cuff is applied about the upper arm in a region overlying the brachial artery.

Most commonly, for measuring blood pressure, a cuff of substantially non-elastic material containing an inflatable bladder is applied to the upper arm. The bladder is then inflated to a pressure sufficient to occlude blood flow in the artery, air pressure in the bladder being thereupon relieved until the Korotkoff tapping sounds are detected with a stethoscope applied to the artery immediately below the cuff. Upon detecting the first tapping sounds, a reading is noted from a calibrated pressure gauge in pressure fluid communication with the cuff. The reading thus obtained is the systolic blood pressure of the individual. As the pressure in the cuff continues to fall, the Korotkoff sounds become muffled and finally cease to be heard. At that point, the pressure reading on the pressure gauge is noted, this being the diastolic blood pressure of the individual.

Apparatus presently used for determining blood pressure generally comprises a pressure-applying pump means in the form of a hand bulb for inflating the bladder, a pressure gauge, e.g. a manometer responsive to the pressure in the bladder and connecting means for providing fluid communication between the hand bulb, the bladder and the pressure gauge.

As connecting means, it is known to use two lengths of flexible tubes, one of which is connected between the hand bulb and the bladder and the other between the bladder and the pressure gauge. Multiple tube connectors, however, complicate the connecting procedure and hence require some skill in making the necessary connections. They also create "rats nests" because of their tendency to become entangled with components of the apparatus and with each other.

It is also known from U.S. Pat. No. 3,148,677 to use as a connecting means a plurality of flexible tubes in series connection between the hand bulb and the bladder. In the patent, the pressure gauge is coupled to the fluid passageways of adjoining tubes by means of a T coupling. A bleed valve is similarly coupled.

While the arrangement of U.S. Pat. No. 3,148,677 avoids a number of the limitations inherent in the use of two lengths of flexible tubes, it has other objectionable features. For example, the apparatus is difficult to handle and manipulate. Readings on the pressure gauge cannot readily be made and, moreover, the apparatus, because of the possibility of damage to the exposed pressure gauge and bleed valve, is subject to malfunction.

BRIEF DESCRIPTION OF THE INVENTION

The problems inherent in the use of prior blood pressure measuring apparatus are mitigated in accordance with the invention by providing an improved apparatus comprising a cuff, an inflatable bladder within the cuff, pump means for inflating the bladder, a pressure gauge for indicating bladder pressure, and connecting means for connecting in fluid communication the pump means, the bladder and the pressure gauge, the connecting means including an elongated nozzle having a longitudinal passage communicating with said pump means, a unitary elongated flexible tube directly connected at its ends to the other end of said nozzle and to said bladder, said connecting means having a transverse passage formed in said nozzle for communication with said longitudinal passage and having a restricted cross-sectional area that is small compared to that of said longitudinal passage, said pressure gauge being in fluid communication with said longitudinal passage through said transverse passage.

The apparatus thus constructed is not only attractive because it lends itself to use by a lay person, but it has the added advantage by virtue of the minimal parts used, of being easy to handle and of low cost construction.

To facilitate reading and to provide added protection for the pressure gauge, and simultaneously to ensure ease of handling, the pump means, the nozzle carried thereby and the pressure gauge are mounted on a casing with the pump means accessible for operation and with the nozzle in direct fluid communication with the pressure gauge through the restricted passage.

To insure the flow of fluid through the nozzle in a direction toward the flexible tube, the pump means is preferably associated at its opposite ends with one-way valves as hereinafter described. Additionally, bleed valves may be carried by the nozzle upstream of the restricted passage for bleeding fluid from the longitudinal passage in the nozzle.

The flexible tube may carry a connector at its end for ready connection to and disconnection from the nozzle.

While the invention is not to be restricted thereto, it is contemplated to provide electrical means for detecting and translating Korotkoff sounds into electrical impulses. For this purpose, transducer means, for example, a crystal microphone, may be provided in the cuff for translating pulse sounds into electrical signals. The electrical signals thus produced, after amplification thereof by conventional amplifier circuits, energize visual or accoustic indicating means. The indicating means and amplifier circuits when forming part of the apparatus are preferably carried by and within the casing. The present invention, therefore, provides a self-usable apparatus for detecting and indicating the systolic and diastolic pressures of an individual without resort to outside assistance.

BRIEF DESCRIPTION OF THE DRAWING

In the Drawing:

FIG. 1A is a block diagram of the electronic amplifier means of FIG. 1;

FIG. 3 is a top view of FIG. 2;

FIG. 4 is an exploded view of part of the apparatus of FIG. 2;

FIG. 5 is a longitudinal section taken through line 5—5 of FIG. 2 looking in the direction of the arrows; and FIG. 6 is a view showing the invention in use by an individual.

For purpose of disclosure, the invention will be described as embodying electronic amplifier means although, as previously mentioned, it has broader applications; i.e. the pulse sounds may be detected with a stethoscope instead of by electrical means.

Figure 1:
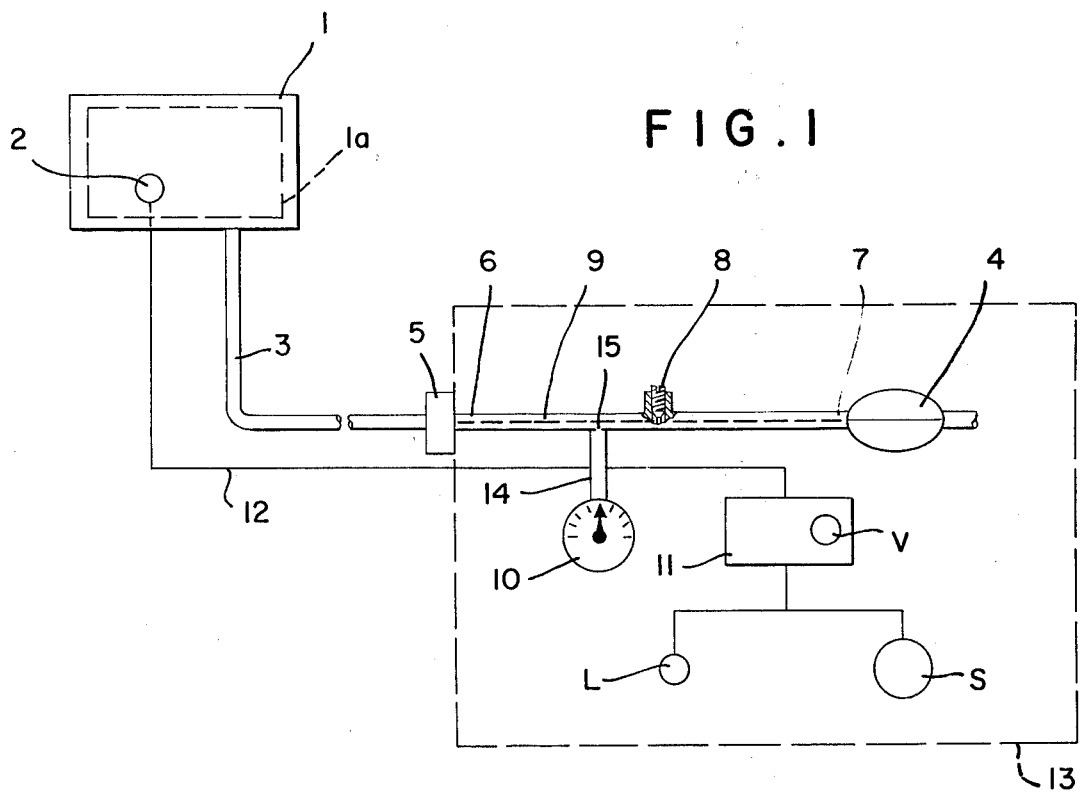
FIG. 1 is a schematic representation of the apparatus in accordance with the invention incorporating electronic amplifier means.
Figure 2:
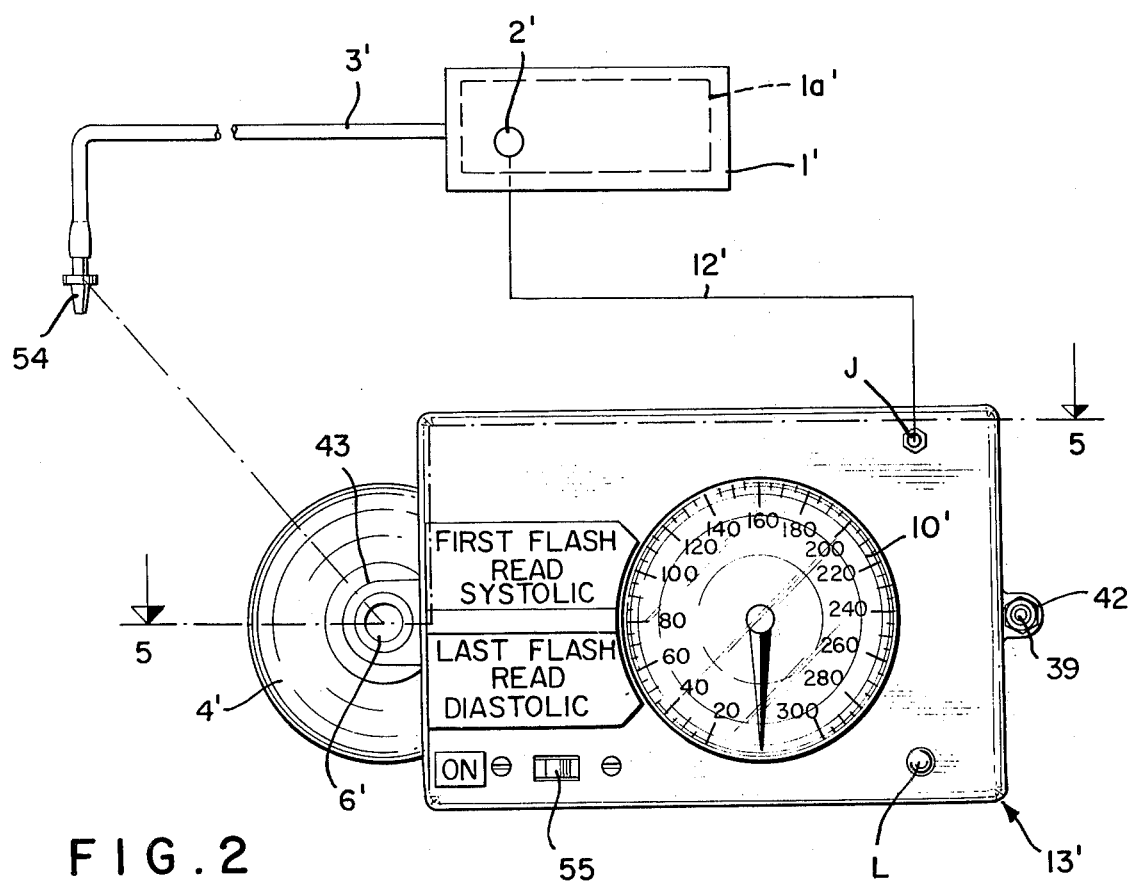
FIG. 2 is a front view of a preferred embodiment of the invention.

Referring now to the drawings and in particular, FIG. 1, there is illustrated a pressure cuff 1 which preferably is of the type disclosed in my application Ser. No. 443,130, filed Feb. 15, 1974, which is a continuation-in-part of my application Ser. No. 300,507, filed on Oct. 25, 1972 and now abandoned, the disclosure of which, by this reference thereto, is incorporated herein as if fully set forth in this application. If desired, however, a conventional type cuff may be used. In either case, whether a conventional cuff or the cuff of my prior application is used and where electrical detection of pulse sounds is contemplated, there is incorporated therein a transducer 2; i.e., an audio pick-up which may be a crystal microphone. The cuff comprises a non-elastic cover and an inflatable bladder 1a enclosed thereby. The bladder 1a is connected by means of a flexible tube 3, preferably a rubber tube, in fluid communication with a conventional pumping means; e.g. a hand squeezable pressure bulb 4, by coupling, as generally shown at 5, the free end of tube 3 to an end of nozzle 6 fitted at its other end 7 to the hand bulb 4 associated with one-way check valves (not shown in FIG. 1) for a purpose more fully hereinafter disclosed. The nozzle 6 may be made of any rigid and impact-resistant material, for example, stainless steel. However, high molecular weight polyolefin materials may also be used for weight and cost reduction.

As shown in FIG. 1, the apparatus includes a needle valve 8 mounted in fluid communication with a central longitudinally extending nozzle passage 9 (shown by phantom lines) downstream of the hand bulb and the one-way valves associated therewith. The needle valve 8 may be factory pre-set to bleed air at a constant rate, for example, at a rate so as to reduce the pressure by 2–3mm of mercury per second. Alternatively, the needle valve 8 may be adapted for adjustment of the bleed rate.

The apparatus further includes a conventional pressure gauge; e.g. an aneroid manometer 10 having a calibrated scale. The manometer 10 is in fluid communication with the nozzle passage 9 proximate to and downstream of the needle valve 8. To facilitate self-measurement of blood pressure, I may provide conventional amplifier means 11 and a suitable power source therefor, preferably in the form of one or more miniature batteries. The amplifier means has its input supplied via conductor 12 from the output of transducer 2 and the output of the amplifier means 11 energizes suitable indicating means, i.e. a lamp L and/or a speaker S. A potentiometer sensitivity control V is included in the amplifier means to bias the trigger circuit of the amplifier means so that the indicating means, preferably lamp L will flash for the first time at systolic pressure and will continue to flash for each pulse thereafter sensed by transducer 2 until the diastolic pressure is reached at which point the trigger circuit; i.e. a conventional multi-vibrator, is rendered inoperative so that lamp L stops flashing. This occurs, as previously explained, when the transducer no longer "senses" Korotkoff pulse sounds. The trigger circuit is factory-adjusted to operate for pulse sounds between systolic and diastolic pressures and once so adjusted, the apparatus of the invention may be used by a novice because the apparatus of this invention requires no special skill or training for self-measurement of blood pressure.

The components of the amplifier means are shown in block diagram form in FIG. 1A. As seen in this figure, the output of transducer 2 is supplied via conductor 12 to a band pass filter stage 11a, the input impedance of which matches the impedance of the transducer 2. The band pass filter stage 11a is designed to pass frequencies in the range of about 40 to 1000 cycles per second. The output of stage 11a is supplied to an amplifier stage 11b which amplifies the electrical signals supplied thereto. The output of the amplifier 11b is coupled by condenser 11c in series with the potentiometer sensitivity control V of FIG. 1 to a detector monostable multi-vibrator stage 11d the function of which is to produce a square wave trigger pulse on detection of an amplified Korotkoff pulse sound supplied from amplifier 11b. As shown, the "on" duration of the square wave trigger pulse is determined by r-c constants in the multi-vibrator stage. The on portion of each pulse is designed to be but a small fraction of the intervals between Korotkoff pulse sounds of hypotensive, normal and hypertensive individuals. The output of stage 11d is supplied to a driver stage 11e the output of which energizes the indicating means which for illustrative purposes is shown to comprise the lamp L.

Although not shown in FIG. 1A, it will be understood that one or more batteries are provided as a power source for the amplifier means stages. Supply of power from the power source to the several stages is controlled by an "on-off" switch.

Referring again to FIG. 1, the hand bulb 4, the nozzle 6, the needle valve 8 and the manometer 10 (and also the amplifier means 11 and the indicating means L and S when forming part of the apparatus) are all carried by or contained within a compact casing generally represented by the dash-line enclosure 13. With the arrangement disclosed only a single unitary elongated flexible tube 3 is required for connecting the hand bulb 4, the cuff 1 and the manometer 10 in fluid communication. Pressurized fluid is made available to the manometer 10 by placing its inlet fitting 14 in fluid communication with the longitudinally extending nozzle passage 9 by means of a restricted transverse passage or restricted opening 15 in the nozzle 6. The cross-sectional area of the restricted passage 15 compared to that of passage 9 is such that only a fraction of the air pressure surge in passage 9, produced by squeezing hand bulb 4, is communicated to the manometer 10. A cross-sectional area for passage 15 which is approximately 1/64 that of the passage 9 has been found to provide limited and discernible pressure variations without danger of damaging the instrument, which would occur if the pressure indicator of manometer 10 were driven off-scale upon pumping of the hand bulb 4.

FIGS. 2 to 6 show a preferred embodiment of the apparatus schematically illustrated in FIG. 1. Like parts in these figures have been assigned the same reference characters as in FIG. 1 with a "prime" notation added.

Referring to FIGS. 2 to 5, when the apparatus of the invention is electrically adapted, the pressure cuff 1' will be fitted with a crystal microphone 2' for reasons heretofore described. The bladder 1a' enclosed in a non-elastic cuff cover 1' is placed by means of the flexible rubber tube 3' in fluid communication with the nozzle 6' and the hand bulb 4'. The hand bulb 4' and its nozzle 6' are connected to the casing 13' proximate the pressure gauge 10' for making available fluid in the longitudinally extending nozzle passage 9' to the pressure gauge as hereinbefore described.

The hand bulb is provided at its opposite ends with one-way valves. At its upper end as viewed in FIG. 5, the hand bulb is provided with a first one-way valve which includes a spherical ball 16 adapted, on application of pressure to the bulb to seal the opening 17.

The lower end of the hand bulb, when the nozzle is fitted thereto as hereinafter described, is associated with a second one-way valve 18 (see FIGS. 4 and 5) constituted of a screw threaded member 19 and a rubber tube 20, the latter being formed with a longitudinal slit 21 through the tube wall intermediate the ends thereof. The rubber tube 20 is attached to screw member 19 by snuggly fitting one end of tube 20 over an undercut portion 22 of the screw member 19. The screw member 19 is formed therethrough with a central longitudinal passage 22a which communicates with the interior of tube 20.

The two part valve assembly 18 is fitted to the nozzle 6' by threadedly engaging the threaded portion of screw member 19 with an internally threaded upper end portion 24 of the nozzle. At its opposite lower end portion, the nozzle is provided with an external thread formation 25.

The nozzle 6', as clearly seen in FIG. 4, has an intermediate enlarged portion 26 from which extends an upper section 27, terminating in an upwardly presented internally threaded portion 24, and a lower section 28 which in turn terminates in an external thread 25. The longitudinal passage 9' extending through the upper section of the nozzle 6' has a larger cross-section than the passage 15' extending through the lower nozzle section, these passages being inter-connected in the enlarged portion 26 by a tapering transition therein. The diameter of the passage 9' in the upper nozzle section 27 is larger than that of the tube 20 so that with the one-way valve 18 fitted to the upper end of the nozzle 6' as previously described, an annular passage 29 (see FIG. 5) is provided between the nozzle 6' and tube 20. The upper nozzle section 27 as thus fitted with the one-way valve 18 is assembled to the lower end 30 of the hand bulb 4' by forcing the upper nozzle section 27 through the opening 31 in the bulb 4' until the upper surface of the enlarged portion 26 engages the lower surface of the bulb (see FIG. 5). Sealing engagement is ensured by an annular formation 32 on the upper nozzle section 27.

It will now be appreciated that with the nozzle 6' assembled to the bulb 4' as described, upon pumping the latter, air under pressure will flow in one direction only, that is into nozzle 6'.

Referring to FIGS. 3, 4 and 5, to permit bleeding fluid from the nozzle passage, there is provided a needle valve 8' which is threadedly received in the enlarged nozzle portion 26. If desired, the needle valve 8' may be adjustable in relation to its seat to permit adjustment of the bleed rate. Preferably, the valve 8' is factory preset for bleeding air from the nozzle passage 9' at a rate to reduce the pressure in the apparatus by 2–3mm of mercury per second.

The casing 13' preferably of a plastic material, has in the illustrated embodiment a front section 33 and a rear section 34 joined to the front section along line 35. Desirably, the rear section 34 is provided at its rear face with a cut-out portion 36 to permit easy access to the batteries, one of which is shown at 37 in FIG. 5, and to the circuit components generally shown at 37a of the amplifier means mounted on a board 37b. The cut-out portion 36 when provided is normally closed by a third casing part 38 adapted for removable connection with the rear casing section 34. The front and rear sections are connected to one another by screw means 39 passing through mating bushing formations 40, 41 integrally formed at one of the sides of the front and rear casing sections 33, 34 respectively, a nut 42 threadedly engaging the projecting end of the screw. Additional connecting means, not shown, may be provided for ensuring rigid connection of the front and rear casing sections. The front casing section 33 at a side opposite the side formed with the bushing 40 is provided with a tubular extension 43.

The sub-assembly comprising the nozzle 6', one-way valve 18 carried thereby and the hand bulb 4' is mounted to the casing by passing lower nozzle section 28 of nozzle 6' through a longitudinal bore or passage 44 in the tubular extension, which passage is sized to generally snugly receive nozzle section 28. As seen in FIG. 5, the lower section is of a length to ensure projection of its threaded end 25 beyond the casing tubular extension 43 when the enlarged nozzle formation 26 engages, through the intermediary of a seal ring 45, the upper surface of the tubular extension. Suitable connecting means; i.e. a nut 45a threadedly engaging the projecting threaded end 25 of the nozzle serves to secure the latter to the casing. A seal ring 46 may be fitted over the projecting threaded end 25 of the nozzle before applying and tightening the nut 45a to ensure against air leaks.

As will be seen in FIGS. 4 and 5, the nozzle in its lower section 28 is provided with a reduced diameter portion 47 which, when the nozzle is mounted to the casing as above described, defines an annular passage or transverse chamber 48 (FIG. 5) which communicates by means of the restricted transverse passage 15' in the nozzle wall with nozzle passage 9' and which also communicates wtih first and second radially aligned passages 49 and 50 respectively provided in the tubular casing extension 43. Passage 50 is of a larger cross-section than passage 49 to permit entry therein of fitting 14' of the pressure gauge 10'. Fitting 14' carries a seal ring 51 for sealing connection with the casing wall to prevent leakage from the annular passage 50 to the atmosphere.

To prevent air leakage from the lower longitudinal end of the annular passage 48, the lower nozzle section 28 is recessed, below its reduced diameter portion 47, to retain a seal ring 52 which sealingly engages the wall of the tubular extension passage 44. Seal ring 45 ensures against air leakage from the upper longitudinal end of the annular passage 48. In practice, seal rings 45, 51 and 52 provide adequate seals against air leakage from the annular passage 48 so that the seal ring 46 at the projecting end of the nozzle may be eliminated, if desired.

To facilitate support of the casing and operation of the hand bulb with one hand only, the rear casing section 34 is provided with a projecting hand grip 53 having a portion of its surface contoured to partially extend about the hand bulb 4' when the nozzle assembly is mounted to the casing as previously described. With this arrangement, the bulb 4' may be squeezed against the hand grip support surface by the fingers of the hand holding grip.

FIG. 6 shows an individual taking his own blood pressure with the apparatus of the invention.

The cuff 1' is shown applied to the arm of the user. The flexible tube 3' is carried at one of its ends by the cuff in fluid communication with the bladder and is provided at its opposite end with a connector 54 (see also FIGS. 2 and 5) which is insertable into an outwardly diverging opening in the bottom end of the nozzle 6'. The connector 54 is provided with a complementary tapered surface to ensure an air tight coupling between the connector 54 and the nozzle 6'.

For electrical measurement of blood pressure, in addition to connecting the connector 54 with the nozzle to complete a fluid path from the hand bulb to the bladder, the output of the microphone 2' is also connected to the input of the amplifier means at jack J by electrical conductor 12', which is preferably sheathed together with flexible tube 3' within conduit 54a.

With the connector 54 and conductor 12' connected as described, on-off switch 55 (see also FIG. 2) is switched on to activate the electronic amplifier means. Squeezing of the hand bulb is then commenced and continued until the pressure in the cuff exceeds the pressure required to stop arterial blood flow. Pumping of the bulb is then terminated and then due to bleeding of air from the nozzle passage through valve 8', the pressure exerted by the cuff on the arm is reduced. As the pressure in the cuff decreases, a cuff pressure will be reached at which Korotkoff tapping sounds are detected. Then because of the setting of the sensitivity control V of the amplifier means, the lamp L will start flashing and the first such flash being coincident with Systolic pressure. Tapping Korotkoff sounds will be detected for a time as the pressure decreases and in consequence the lamp will continue to flash until the Korotkoff sounds become muffled and finally cease to be detected by the microphone. Flashing of the lamp ceases at diastolic pressure, the pressure indicated at the last flash being the user's diastolic pressure.

It will be apparent from the foregoing description that once the apparatus has been pumped up to a pressure above "systolic" no further positive action need be taken by the user except to take two readings from the pressure gauge, the first when the lamp starts flashing and the second when it stops flashing.

It will be appreciated by those skilled in the art that the apparatus of the invention, when electrically adapted as above described, may also be used for determining the pulse rate of the user. To this end, the bleed valve is preferably recessed in the outer nozzle wall to facilitate blocking as by a finger pressed over the recessed zone to prevent the escape of air. Finger pressure is applied when the pressure in the system lies within the systolic-diastolic pressure range of the individual so that the lamp will flash with each pulse beat.

The invention provides an apparatus which is rugged, inexpensive to make and sufficiently compact so that it can be operated with one hand only, thereby facilitating self-measurement of blood pressure.

What is claimed is:

1. Blood pressure measuring apparatus comprising a cuff, an inflatable bladder within said cuff, pump means for inflating said bladder, a pressure gauge for indicating bladder pressure, a casing having a chamber housing said pressure gauge and an extension adjacent said chamber formed with a tubular bore, said casing having an aperture communicating said chamber with said tubular bore, said pressure gauge having an inlet fitting located in said casing aperture for fluid communication solely with said tubular bore, an elongated nozzle extending through said tubular bore and having a longitudinal passage with one end communicating with said pump means, a length of flexible tube interconnecting said bladder with the other end of said nozzle, a restricted opening formed in said nozzle communicating said longitudinal passage with said pressure gauge inlet fitting through an otherwise sealed transverse chamber which is substantially co-extensive with an intermediate portion of said tubular bore surrounding said nozzle and communicating with said casing aperture, and a bleed valve means to permit bleeding from said longitudinal passage located along the nozzle between said opening and said pump means end and being preset for bleeding at a predetermined rate.

2. The apparatus defined in claim 1 in which the pump means is provided as a hand bulb directly mounted on said nozzle first end, the latter projecting beyond said casing extension, said casing, gauge, nozzle and hand bulb being constructed and arranged whereby said apparatus and the hand bulb are held and operated solely by one hand.

3. The apparatus defined in claim 1 in which said nozzle opening has a cross-section that is small compared to that of said longitudinal passage.

4. Apparatus according to claim 3, wherein the cross-sectional area of the nozzle opening is approximately 1/64 that of said longitudinal passage.

5. The apparatus defined in claim 1 in which said nozzle is formed with a reduced diameter portion defining said transverse chamber within said tubular bore intermediate portion.

6. Apparatus according to claim 1, wherein the end of the flexible tube distant from the bladder end is provided with a connector for ready connection with and disconnection from the end of the nozzle.

7. Apparatus according to claim 1, wherein transducer means is provided in said cuff for translating pulse sounds into electrical signals, indicating means for providing an indication when the pulse sounds are detected, an electrical circuit means having an input supplied with said electrical signals from said transducer means and an output for energizing said indicating means as a function of said electrical signals.

8. Apparatus according to claim 1, wherein transducer means is provided in said cuff for translating pulse sounds into electrical signals, indicating means for providing an indication when the pulse sounds are detected, an electrical circuit means having an input supplied with said electrical signals from said transducer means and an output for energizing said indicating means as a function of said electrical signals, said indicating means and said electrical circuit means are respectively mounted on and included within said casing.

9. Apparatus according to claim 8, wherein said transducer means, said electrical circuit means and said indicating means are constructed and arranged to provide an indication solely during that interval during which pressure within the bladder corresponds to the systolic-diastolic blood pressure range of the user.

10. Blood pressure measuring apparatus comprising a cuff having an inflatable bladder therein and a transducer for converting arterial pulse sounds into electrical energy; a compact casing which houses an elongated nozzle having a longitudinal passage and opposite ends projecting from the casing, amplifier means for said pulse sound generated electrical energy, indicating means responsive to said amplifier means providing indication of detected pulse sounds, a source of electrical power for operating said amplifier means and indicating means, and a pressure gauge for indicating bladder pressure; lengths of electric wiring and flexible tubing extending between the cuff and casing for respectively interconnecting said transducer and bladder in the cuff with said amplifier means and one of said projecting ends of said nozzle for communication with said longitudinal passage; pump means mounted on the other of said opposite ends of said nozzle for inflating said bladder through said nozzle and tubing, a bleed valve on said nozzle operative to bleed said inflated bladder at a predetermined rate, and fluid conducting means within said casing surrounding said longitudinal passage interconnecting an intermediate portion of said nozzle with said pressure gauge for said bladder pressure indication; said pump means, casing, pressure gauge, amplifier means, and indicating means being constructed and arranged for operation by holding the casing in one hand solely by grasping said pump means for said bladder inflation and for supporting the casing to take a blood pressure reading during a bladder bleeding interval by simultaneous observation and comparison of the pressure gauge and the indicating means.

* * * * *